JOHN A. HOLM
JACQUES MOSIER
INVENTORS

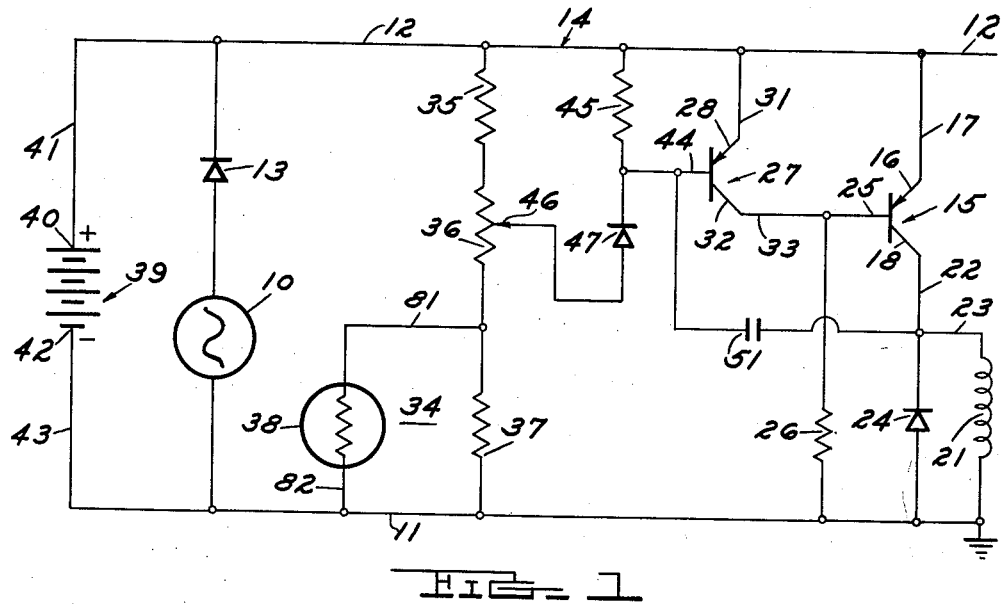

United States Patent Office 3,121,837
Patented Feb. 18, 1964

3,121,837
ELECTRICAL GENERATOR REGULATOR
John A. Holm, Dearborn, and Jacques Mosier, Ypsilanti, Mich., assignors to Ford Motor Company, Dearborn, Mich., a corporation of Delaware
Filed Apr. 28, 1960, Ser. No. 25,387
5 Claims. (Cl. 322—28)

This invention relates to an electrical generator regulator and more particularly to an electrical generator regulator which may readily be employed in an automotive vehicle.

In conventional generator regulating units employed in automotive vehicles, three electromechanical relay units are generally used. A cutout relay is employed to prevent the battery from discharging back through the generator when the generator output falls below the terminal voltage of the battery. A current regulator and a voltage regulator, both employing electromechanical relays, are also used. The current regulator limits the amount of current that the generator can produce thereby preventing the generator output from exceeding a safe maximum. The voltage regulator, on the other hand, limits the terminal voltage of the generator to prevent battery overcharge and to prevent excessively high voltages in the electrical system of the vehicle.

The regulating system described above performs a perfectly satisfactory job of generator regulation, however, it suffers from the disadvantage that the electromechanical relays require periodic adjustment to maintain proper current and voltage values. Furthermore, the contact points on these relays are subject to pitting and arcing and, in severe cases, are subject to being welded together.

In typical voltage and current regulators the armatures of the voltage and current regulating relays may vibrate from 50 to 200 times a second. The rapid cycling of the regulators may cause mechanical failures in these units, and this together with the difficulties with the contact points may make it necessary to replace the regulating units.

The present invention seeks to obviate the above mentioned difficulties by providing a static electrical generator regulator which has no moving parts. According to a preferred embodiment of the invention, an electrical alternator is employed which uses semi-conductor diodes to rectify the output thereof. The semi-conductor diodes also act as a means for preventing the battery from discharging back through the alternator when the alternator voltage falls below the terminal voltage of the battery. This eliminates the need for the cutout relay which is employed in the conventional system described above. An alternator is inherently a self limiting machine with respect to current output, therefore, the current limiting relay described above can be eliminated.

Voltage regulation in the present invention is accomplished by means of a voltage regulator employing semiconductor devices. In the preferred embodiment of the voltage regulator a transistor is connected in series with the field winding of the alternator across the terminals of the alternator, and this transistor is controlled by a second transistor which is normally non-conducting. A zener diode is connected to the input circuit of the second transistor and is connected to an adjustable arm of a voltage divider that is connected across the terminals of the alternator. When the alternator terminal voltage exceeds a certain level, the zener diode breaks down thereby causing the second transistor to conduct. This in turn causes the first transistor to cease conduction thereby reducing the current flow through the alternator field winding to a negligible value.

An important feature of the transistorized voltage regulator described above is the provision of the adjustable voltage divider which has the adjustable arm thereof connected to one terminal of the zener diode. This provides an easily adjustable means for compensating for variations in the characteristics in zener diodes which may be employed in mass production of the voltage regulators.

Another important feature of the invention is the provision of a temperature compensation element which forms a part of the adjustable voltage divider network described above. This temperature compensation element is preferably in the form of a negative temperature coefficient thermistor and is preferably positioned in the electrolyte of the storage battery employed in the automotive vehicle.

Another important feature of the invention is the provision of a means to provide true switching action between the two transistors. The transistors, therefore, are either full "on" or full "off" and a very rapid transition takes place between these two states. This permits smaller and less expensive transistors to be employed than is possible in certain prior art devices in which transistors are employed as variable resistors.

Transistors are temperature sensitive devices in that high temperatures may cause erratic operation, and if certain safe limits are exceeded the transistors may be damaged. In order to prevent erratic operation and to prevent damage to the transistors, they are supported by the motor vehicle in a position where the heat generated by the engine does not appreciably affect their temperature. The transistors are preferably located outside the engine compartment on the opposite side of the firewall from the engine.

An object of the invention is the provision of an electrical generator regulator for a motor vehicle.

Another object of the invention is the provision of an electrical regulator for an alternator to be employed in a motor vehicle.

A further object of the invention is the provision of a transistorized voltage regulator for the electrical generating system of an automotive vehicle.

Still another object of the invention is the provision of a transistorized voltage regulator for a motor vehicle which employs positive switching action and a temperature compensation means.

A further object is the provision of a transistorized voltage regulator for a motor vehicle which employs a zener diode and means for compensating for variations in the characteristics of the zener diodes for voltage regulators produced on a mass production basis.

Another object of the invention is the provision of a transistorized voltage regulator for a motor vehicle in which the transistors employed are located so that the heat from the engine does not adversely affect the operating characteristics of the transistors.

Other objects and attendant advantages of the present invention will become more readily apparent as the specification is considered in connection with the attached drawings in which:

FIG. 1 is a circuit diagram of one embodiment of the present invention;

FIG. 2 is a circuit diagram of another embodiment of the invention;

Figure 3:
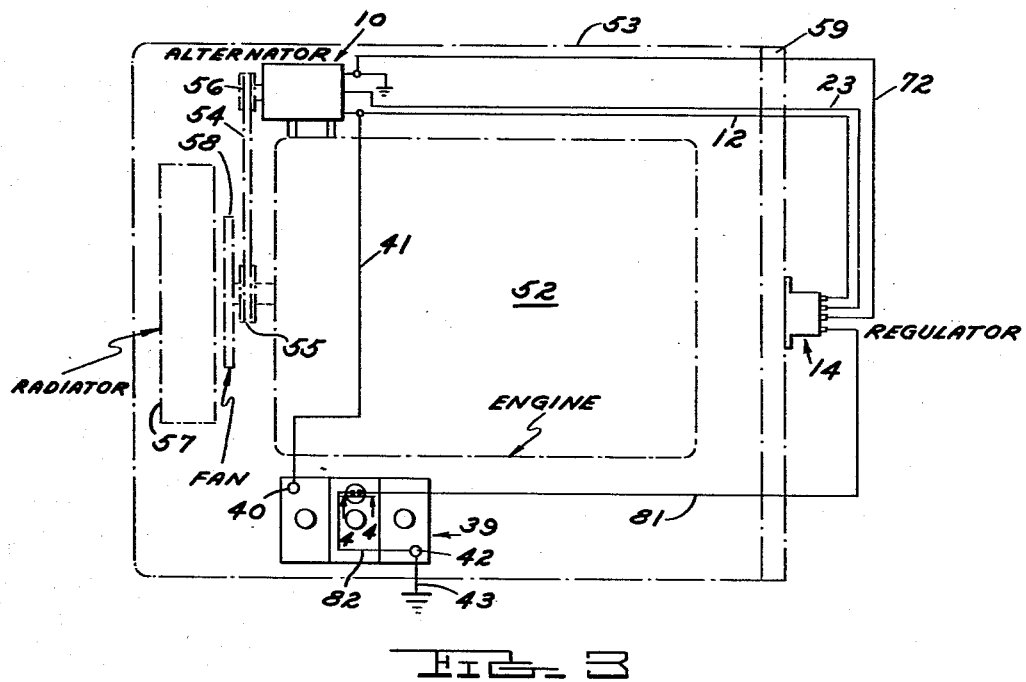
FIG. 3 is a view showing the position of the various components of the invention in a motor vehicle, and, FIG. 4 is a sectional view taken along the lines 4—4 of FIG. 3 showing the position of the temperature sensitive element of the present invention.

Referring now to the drawings in which like reference numerals designate like parts throughout the several views thereof, there is shown in FIG. 1 a circuit diagram of one embodiment of the invention in which an electrical generator, for example, an alternator 10, is connected at one terminal to a line 11 and at the other terminal to a line 12 through a rectifier or diode 13. A voltage regulator, generally designated by the numeral 14, is connected across the lines 11 and 12. The electrical components of the motor vehicle in which the invention is mounted are also connected across the lines 11 and 12.

The voltage regulator includes a power transistor 15 having an emitter 16 connected to line 12 through a lead 17, and a collector 18 connected to the field winding 21 of the alternator 10 through leads 22 and 23. The collector 18 is also connected, through lead 22, to a diode 24 which provides a return circuit for the current induced in the field winding 21 when the field is deenergized. The power transistor 15 also includes a base 25 which is connected to the line 11 through a resistor 26.

A second transistor, generally designated by the numeral 27, includes an emitter 28 connected to line 12 through lead 31, and a collector 32 connected to the base 25 of transistor 15 and to the resistor 26 through lead 33.

A variable voltage divider network, generally designated by the numeral 34 is connected across the lines 11 and 12. This variable voltage divider includes resistors 35, 36 and 37 connected in series and a negative temperature coefficient thermistor 38 connected in parallel with resistor 37. As can readily be appreciated by an inspection of FIG. 1, this variable voltage divider is connected across the terminals of the alternator 10, including diode 13, and across the terminals of a storage battery 39. The storage battery has a positive terminal 40 connected to line 12 through a lead 41 and a negative terminal 42 connected to line 11 through a lead 43.

The base 44 of transistor 27 is connected to line 12 through a resistor 45. The base 44 is also connected to an adjustable arm 46 of the variable voltage divider 34 through a zener diode 47. The adjustable arm 46 makes contact with resistor 36. The zener diode 47 is poled to prevent conduction of the transistor 27 until the breakdown voltage of the diode is reached. A capacitor 51 is connected between the base 44 of transistor 27 and the collector 18 of transistor 15 to provide bistable switching of the transistors. This will be explained more fully when the operation of the circuit is described.

FIG. 2 discloses another embodiment of the invention which is similar to the embodiment disclosed in FIG. 1, except that the variable voltage divider is connected to the base of the power transistor 15 and to the collector of transistor 27 rather than to the line 12. In this embodiment of the invention, a plurality of resistors connected in series, and designated by the numerals 35', 36' and 37', are connected between the lead 33, which connects the base 25 of transistor 15 with the collector 32 of transistor 27, and the line 11. As will be more fully explained subsequently, this eliminates the necessity for capacitor 51 as shown in FIG. 1. The negative temperature coefficient thermistor 38 is connected across the resistor 37', and the adjustable arm 46 is connected to the zener diode 47, and makes contact with the resistor 36'.

Referring now to FIG. 3, there is shown the electrical generating and regulating system of an automotive vehicle that includes an engine 52 positioned within an engine compartment 53, both of which are shown in phantom form. The engine drives an electrical generating unit, preferably the alternator 10, through a belt 54 and pulleys 55 and 56. Engine coolant in a radiator 57 is cooled by an engine driven fan, designated by the numeral 58. A firewall 59 defines one boundary of the engine compartment 53. The battery 39 is positioned within the engine compartment, and has the positive terminal thereof connected to the armature of the alternator 10 through the lead 41.

Figure 4:
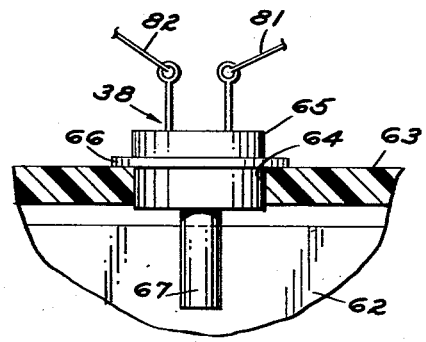

The transistorized voltage regulator, which has been designated by the numeral 14, is mounted in a position where the heat from the engine cannot adversely affect the operation of the transistors 15 and 27. It is preferably mounted on the face of the firewall 59 opposite the engine 52, as shown in FIG. 3. The thermistor, designated by the numeral 38, is positioned to sense a temperature condition suitable for providing temperature compensation for the transistorized voltage regulator. As shown in FIGS. 3 and 4, it is preferably positioned in the electrolyte 62 of battery 39.

The battery 39 includes an upper wall 63 having an internal bore 64 positioned therein for receiving a cylindrical supporting structure, generally designated by the numeral 65, for the thermistor 38. This supporting structure includes a flange 66 which engages the top of the upper wall 63. The temperature sensitive element per se is positioned in a cylindrical tube 67 which extends from the supporting structure 65, and as shown in FIG. 4, this temperature sensitive element per se, is immersed in the electrolyte 62.

Referring again to FIG. 3, the positive terminal 40 of the battery 39 and one terminal of the alternator 10, are connected to the transistorized voltage regulator 14 through the line 12. The negative terminal 42 of the battery 39 is connected to ground or line 11 which is a common ground for the system through lead 43. The field 21 of the alternator is connected to the collector 18 of power transistor 15 through the lead 23, and this has been shown in FIG. 3. Furthermore, the resistors 26 and 37 are connected to ground through a lead 72. It is to be understood that the lead 11, as shown in FIGS. 1 and 2, designates a common ground for the various elements and therefore in the physical configuration of the various components of the invention a continuous line 11 will not be present. As previously explained in connection with FIGS. 1 and 2, the thermistor 38 is connected across the resistor 37 or 37'. This is accomplished by leads 81 and 82 which can be seen in FIGS. 3 and 4 connecting one terminal of the thermistor with regulator 14 and the other terminal to the negative terminal 42 of the battery 39. These leads are also shown in FIGS. 1 and 2.

Referring now to FIG. 1, the operation of this embodiment of the invention will be described. During operating conditions in which the voltage supplied by the alternator 10 has not reached a voltage sufficient to cause the breakdown of the zener diode 47, the transistor 15 is fully conducting and the transistor 27 is in a nonconducting state. Prior to the time of the breakdown of the zener diode 47, the transistor 27 cannot conduct because the zener diode blocks current flow from the base 44. Transistor 15 is in a conducting state because the emitter 17 is connected to the positive terminal 40 of the battery 39 and the positive terminal of the alternator 10, and the base 25 is connected to the negative terminals of the battery and the alternator through the resistor 26. When the transistor 15 is in its fully conducting state, the field winding 21 of the alternator 10 receives its maximum current and, therefore, the output of the alternator is at its maximum value.

The voltage divider 34 provides a means for sensing a voltage to be applied to the zener diode 47. When the alternator 10 delivers a sufficient voltage such that the voltage across the terminals of the zener diode 47 reaches the breakdown voltage, the diode presents substantially zero impedance to the flow of current out of the base 44 of transistor 27. After the breakdown of the zener diode 47, it can be appreciated that the base 44 of transistor 27 is biased negatively with respect to the emitter 31 through the adjustable voltage divider 34 and resistor 45. This causes conduction of transistor 27, and current flows from line 12 through lead 31, emitter 27, collector 32, line 33 and resistor 26, to the grounded line 11. This raises the potential of the base 25 of the transistor 15 and, therefore, tends to shut off this transistor and to reduce the current flowing through the field winding 21. When this happens the voltage of the collector 18 goes negative with respect to its voltage during the fully conducting state. The capacitor 51, which is connected between the collector 18 and the base 44 of transistor 27 applies a negative pulse to the base 44, thereby rapidly driving transistor 27 to its fully conducting state and rapidly driving transistor 15 to its fully nonconducting state.

When the voltage across the lines 11 and 12 falls to a point where the voltage across the zener diode approaches the zener voltage, the zener diode reduces the current flow from the base of the transistor 27 to a negligible value and the transistor 27 is shut off thereby causing transistor 15 to conduct.

The capacitor 51 again ensures that the switching action will take place in a rapid fashion in the reverse order from that described above. Thus, the transistor 15, which must carry the current for the field winding 21, is rapidly switched between its fully "on" and its fully "off" states, with a rapid transition between these two states. This true switching action permits a smaller and less expensive transistor to be used for carrying the field current than would be possible if the transistor 15 were employed as a variable resistor, as is common in certain prior art devices.

As was previously discussed, the embodiment of the invention shown in FIG. 2 is similar to the embodiment shown in FIG. 1 except that the variable voltage divider 34 is connected to the base 25 of transistor 15 and the collector 32 of transistor 27 through line 33, rather than to the line 12. Additionally, the resistor 26 and the capacitor 51 have been eliminated. The operation of the embodiment of the invention shown in FIG. 2 is also similar to that of the device shown in FIG. 1. In this embodiment of the invention, the transistor 15 is in its fully conducting state and transistor 27 is fully cut off during the time the zener diode 47 is in the blocked condition. The variable voltage divider is, therefore, connected to line 12 through the emitter and base of transistor 15. When the zener diode 47 breaks down, the transistor 15 is switched to the nonconducting state while transistor 27 is switched to the conducting state. At this time the variable voltage divider 34 is connected to line 12 through the emitter and collector of transistor 27. The voltage drop across the emitter-base of transistor 15 is approximately one-half a volt when this device is in its fully conducting condition, while the voltage drop across the emitter-collector of transistor 27 is approximately one-quarter of a volt when this transistor is in its fully conducting condition.

When the alternator 10 reaches a voltage sufficient to break down the zener diode 47, the transistor 27 commences conducting and the transistor 15 commences to shut off. Since the voltage drop across the emitter-collector of transistor 27 is less than the voltage drop across the emitter-base of transistor 15, the voltage at the adjustable wiper arm 47 is immediately raised, therefore increasing the voltage across the zener diode 47. This in turn causes a very rapid breakdown of zener diode 47 and a very rapid transition of transistor 27 from its full "off" to its full "on" condition, and, therefore, a very rapid transition of transistor 15 from its fully "on" condition to its fully "off" condition.

When the voltage output from the alternator 10 falls to the point where the zener diode 47 may recover its blocking action, the reverse of the above sequence of events takes place. The zener diode 47 is rapidly taken from its unblocked to its blocked condition while a rapid transition takes place in the states of the transistors 15 and 27. The transition of transistor 27 from its fully "on" condition to its fully "off" condition and the transition of transistor 15 from its fully "off" condition to its fully "on" condition takes place in a very rapid manner. Thus, by connecting the variable voltage divider 34 to the base of transistor 15 and the collector of transistor 27, the applicant provides rapid switching times between the states of the transistors 15 and 27, without the necessity for the capacitor 51 as shown in FIG. 1. Additionally, the resistor shown in FIG. 1 has been eliminated.

A device constructed in accordance with the principles of this invention may have the following components which are the same for the embodiments of FIGS. 1 and 2 unless otherwise noted. It is to be understood that these components and their values are given by way of example only, and are in no way intended to restrict the scope of the invention.

Transistor _____ 2N669.
Transistor 27_____ 2N224.
Diode 24_____ Silicon diode having a rating of 500 ma. at 50 volts.
Resistor 26_____ 300 ohms.
  (FIG. 1 only)
Resistances 35 and 35'__ 150 ohms.
Resistances 36 and 36'__ 50 ohms.
Resistances 37 and 37'__ 65 ohms.
Thermistor 38_____ 85 ohms plus or minus 20% at 100° F. and 10.5 ohms plus or minus 5% at 224° F.
Resistance 45_____ 82 ohms.
Capacitor 51_____ 0.02 mfd.
  (FIG. 1 only)
Zener diode 47_____ 1.5 M10Z.
Battery 59_____ A standard 12 v. automotive vehicle battery.
Alternator 10_____ An alternator capable of supplying the power requirements for a standard automotive vehicle and rated at 15 v. and 35 amps with a field resistance of 6 ohms.

In cold weather operations, when the storage battery 39 is cold, the alternator 10 must supply a higher voltage than it does during warm weather operations. To provide temperature compensation, the negative temperature coefficient thermistor 38 is connected to sense a condition suitable for providing this temperature compensation. It is preferably positioned in the electrolyte of the battery since a higher voltage applied across the terminals of the battery is necessary to provide proper charging when the battery is cold than when it is hot. Thus, as the temperature of the electrolyte goes down the resistance of thermistor 38 increases. The voltage at the adjustable arm 46 is, therefore, a lesser percentage of the total voltage applied across lines 11 and 12 when the battery is cold than it is when the battery is hot. Thus, during cold weather operation, when the battery is cold, it requires a higher voltage output from the alternator 10 to break down the zener diode 47 and thus reduce the current in the field winding 21 than it does during warm weather operations when the battery is hot.

The adjustable arm 46 of the voltage divider provides a means for compensating for variations in the characteristics or the breakdown voltage of various zener dioes which may be employed in voltage regulators produced on a mass production basis. In production, the adjustable arm 46 may be set so that each voltage regulator coming off the production line will have the same characteristics.

Although the invention is shown employing PNP type transistors the invention is in no way limited to this type of transistor. It will be readily apparent to those skilled in the art how the circuit of the invention may be connected to employ other types of transistors, for example, NPN type transistors. The invention may also be employed with a positive ground system with minor changes which will be readily apparent to those skilled in the art.

The present invention thus provides an inexpensive and uncomplicated transistorized voltage regulator for a motor vehicle which is reliable and efficient in operation.

It will be understood that the invention is not to be limited to the exact construction shown and described,

We claim:

1. An electrical generating system comprising a first transistor and a second transistor connected in cascade, a generator having a first terminal and a second terminal, said first transistor having an output circuit including a generator field winding, said output circuit having one terminal connected to the first terminal of the generator and a second terminal connected to the second terminal of said generator, an adjustable voltage divider including an adjustable arm and having one terminal connected to the first terminal of said generator and having a second terminal connected to the input circuit of said first transistor and to the output circuit of said second transistor, a zener diode having one terminal connected to the adjustable arm of said voltage divider and having another terminal connected to the input of said second transistor, said zener diode being poled to prevent conduction of said second transistor until the voltage applied across it reaches the zener breakdown voltage.

2. An electrical generating system comprising a generator having a field, a first transistor having an input circuit and an output circuit, a second transistor having an input circuit and an output circuit, said field being positioned in the output circuit of said first transistor, the output circuit of said second transistor being connected to the input circuit of said first transistor, said first transistor being in a conducting state and said second transistor being in a non-conducting state when the voltage output from said generator is below a selected voltage, means connected in said system and to the input circuit of said second transistor for producing a voltage in response to a selected voltage output from said generator, said voltage switching said second transistor from the non-conducting state to the conducting state and said first transistor from the conducting state to the non-conducting state, and means connected to said transistors for accomplishing a rapid transition between the states of the two transistors, said last mentioned means including said means for producing a voltage in response to a selected output voltage of said generator connected to the input circuit of said first transistor and the output circuit of said second transistor.

3. An electrical generating system comprising a generator having a field, a first transistor having an input circuit and an output circuit, a second transistor having an input circuit and an output circuit, said field being positioned in the output circuit of said first transistor, the output circuit of said second transistor being connected to the input circuit of said first transistor, said first transistor being in a conducting state and said second transistor being in a non-conducting state when the voltage output from said generator is below a selected voltage, a voltage divider connected to the input circuit of said first transistor and to the output circuit of said second transistor for producing a voltage in response to a selected voltage output from said generator, means for applying said voltage to the input circuit of said second transistor, said voltage switching said second transistor from a nonconducting state to a conducting state and said first transistor from the conducting state to the nonconducting state, said voltage divider connected between the input circuit of said first transistor and the output circuit of said second transistor providing a means for accomplishing a rapid transition between the states of the two transistors.

4. An electrical generating system comprising a first transistor and a second transistor connected in cascade, a generator having a first terminal and a second terminal, a battery connected across the first and second terminals of the generator, said first transistor having an output circuit having one terminal connected to the first terminal of the generator and a second terminal connected to the second terminal of said generator, a voltage divider including an arm and having one terminal connected to the first terminal of said generator and having a second terminal connected to the input circuit of said first transistor and to the output circuit of said second transistor, said voltage divider including a temperature sensitive element positioned in the electrolyte of said battery, a zener diode having one terminal connected to the arm of said voltage divider and having another terminal connected to the input of said second transistor, said zener diode being poled to prevent conduction of said second transistor until the voltage applied across it reaches the zener breakdown voltage.

5. In a motor vehicle, an engine compartment, an engine positioned within said compartment, a generator driven by said engine, a battery connected to said generator, a regulator connected to said battery and to said generator for regulating the output of said generator, said regulator comprising a first and second transistor connected in cascade, said first transistor having an output circuit including a generator field winding, said output circuit having a first terminal connected to one of the terminals of the generator and a second terminal connected to the other terminal of the generator, a voltage divider including an arm, and having a first terminal connected to one terminal of the generator and a second terminal connected to the input of said first transistor and to the output of said second transistor, a zener diode having one terminal connected to the arm of said voltage divider and having the other terminal connected to the input of said second transistor, said zener diode being poled to prevent conduction of said second transistor until the voltage applied across it reaches the zener breakdown voltage, said voltage divider including a temperature sensitive element positioned to sense the operating temperature of said battery, the remainder of said regulator being positioned outside said engine compartment.

References Cited in the file of this patent

UNITED STATES PATENTS

| | | |
|---|---|---|
| 2,786,173 | Martin et al. | Mar. 19, 1957 |
| 2,945,174 | Hetzler | July 12, 1960 |
| 2,945,999 | Dreyfus | July 19, 1960 |
| 2,965,830 | Isel | Dec. 20, 1960 |